UNITED STATES PATENT OFFICE.

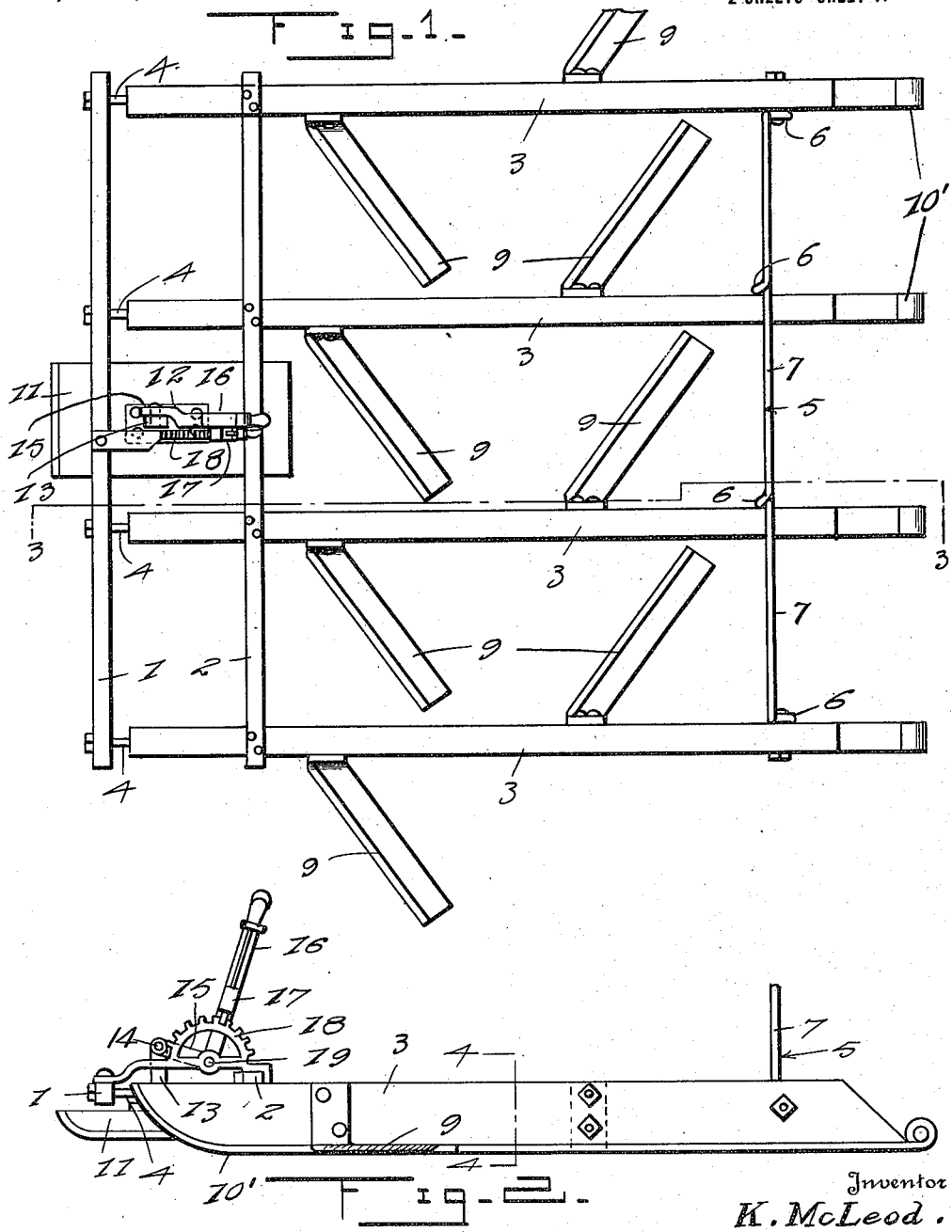

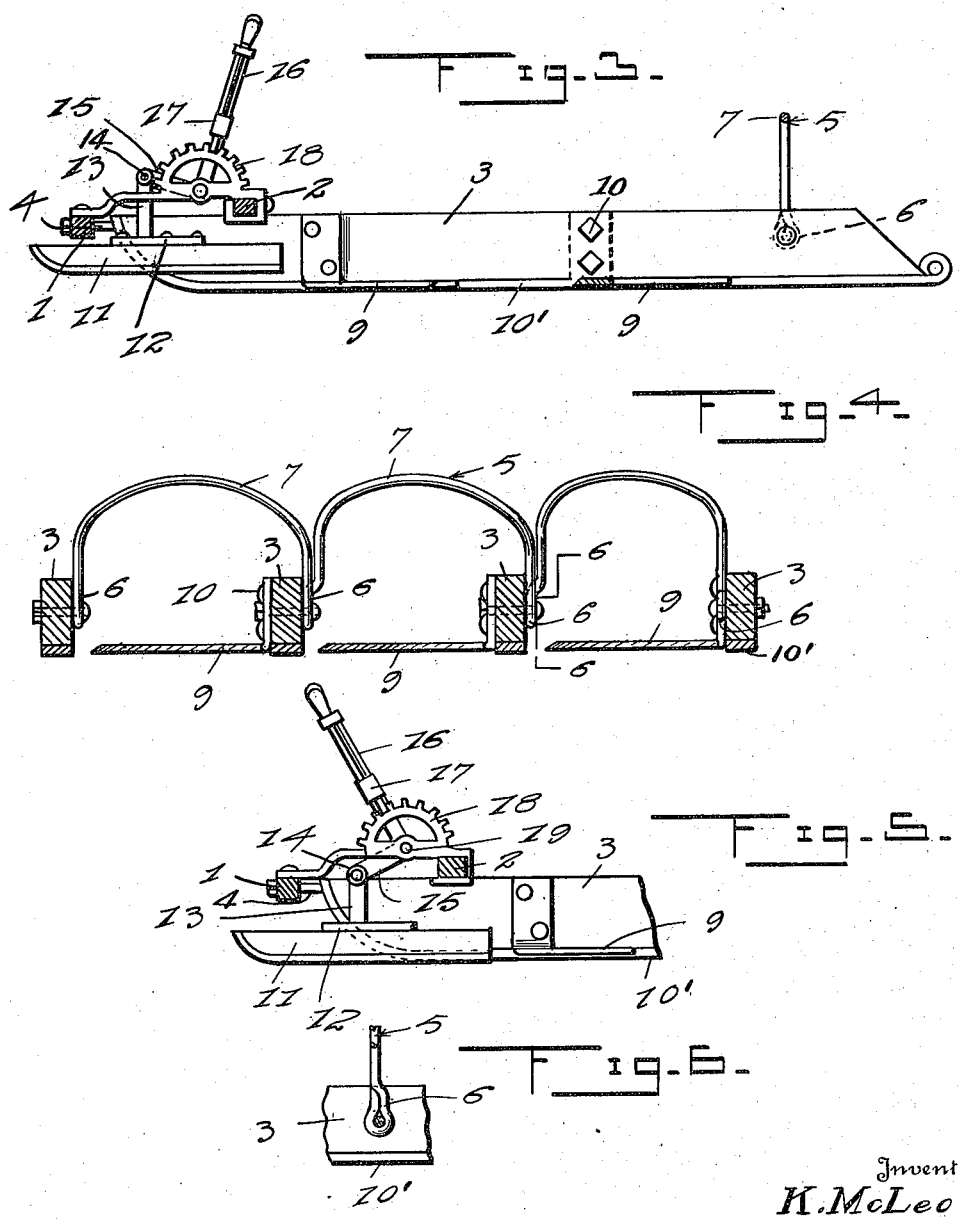

KEITH McLEOD, OF CALGARY, ALBERTA, CANADA.

WEEDER.

1,218,436. Specification of Letters Patent. Patented Mar. 6, 1917.

Application filed May 12, 1916. Serial No. 97,093.

*To all whom it may concern:*

Be it known that I, KEITH McLEOD, a citizen of the United States, residing at Calgary, in the Province of Alberta and Dominion of Canada, have invented certain new and useful Improvements in Weeders; and I do hereby declare the following to be a full, clear, and exact description of the invention, such as will enable others skilled in the art to which it appertains to make and use the same.

This invention relates to weeders, and the primary object of the invention is to provide a device which will cut weeds, and which includes a plurality of runners, which have blades extending transversely therefrom at lines oblique to the direction of travel of the weeder.

A further object of this invention is to provide a weeder as specified, which has a shoe adjustably connected to the forward end of the same, which shoe is movable in a vertical plane for movement into a ground-engaging position for raising the front end of the weeder off the ground, and movable vertically away from the ground for permitting the front end of the runners to ride upon the ground for the purpose of cutting weeds.

With the foregoing and other objects in view, the invention consists in the novel construction, combination and arrangement of parts as will be hereinafter specifically described, claimed and illustrated in the accompanying drawings, in which:

Figure 1 is a top plan view of the improved weeder,

Fig. 2 is a side elevation of the weeder,

Fig. 3 is a section on the line 3—3 of Fig. 1,

Fig. 4 is a section on the line 4—4 of Fig. 2,

Fig. 5 is a fragmentary section through the front end of the weeder, showing the shoe in a position for elevating the front end of the runners, and Fig. 6 is a section on the line 6—6 of Fig. 4.

Referring more particularly to the drawings, 1 and 2 designate the transversely extending supporting bars of the weeder, which have a plurality of runners 3 attached thereto. The runners 3 are connected to the front bar 1 by means of bolts, as indicated at 4, and they have their rear ends connected by a rod 5, which is twisted intermediate its ends, as shown at 6, and connected to each of the runners. The rod 5 is bent intermediate the twisted portions 6 to form arches 7, which extend from one runner to the other.

Each of the runners 3 has weed cutting blades 9 attached thereto, in any suitable manner, as shown at 10. One of the blades 9 projects outwardly in one direction from one side of the runner, while the other blade projects in the opposite direction from the opposite side of the runner, as clearly shown in Fig. 1 of the drawings. The positions of the blades 9 form a front row of blades all of which angle in one direction, or to the left, while the rear row of blades angles in the opposite direction or to the right, providing a cutting edge which will cut weeds over the entire surface of the ground over which the weed cutter travels, and also cut the weeds upon each side of the outermost runners 3 a distance equal to the cutting length of the outermost blade 9.

The runners 3 are provided with metallic shoes 10′, which are provided for preventing undue wear upon the runners during the operation of the weeder.

A shoe, or relatively small runner, 11 is provided, which is positioned at the center of the front end of the weeder structure. The runner 11 has a plate 12 attached to its upper surface, upon which is formed an upstanding arm 13. The upstanding arm 13 is pivotally connected, as shown at 14, to the angled end 15 of a pivotally mounted hand lever 16. The hand lever 16 has a dog mechanism 17 carried thereby which co-acts with a quadrant 18, for holding the hand lever in adjusted position. The hand lever 16 is pivoted, as shown at 19, so that when it is moved in a forward position, as illustrated in Fig. 5 of the drawings, the runner 11 will be lowered into a ground-engaging position for raising the front ends of the runners 3 off the ground, and consequently raising the cutting blades 9 off the ground and out of a cutting position. When the hand lever 16 is moved rearwardly, as illustrated in Fig. 3 of the drawings, it will raise the shoe 11, above the surface of the ground and in an inoperative position.

From the foregoing description, taken in connection with the accompanying drawings, the advantages of construction and of the method of operation of the improved weeder will be apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a weeder structure, the combination, of a pair of forwardly positioned cross supporting bars, a plurality of runners connected to said bars, shoes attached to the under surfaces of said runners, a plurality of weed cutting blades attached to said runners and extending outwardly therefrom at angles obliquely to the runners, said blades arranged in a forward row and a rearward row, the blades in the forward row angling oppositely to the blades in the rearward row, and a rod being twisted intermediate of its ends and attached to each of said runners, the portions of said rod intermediate the runners and twisted portions being arched.

2. In a weeder structure, the combination, of a pair of forwardly positioned cross supporting bars, a plurality of runners connected to said bars, shoes attached to the under surfaces of said runners, a plurality of weed cutting blades attached to said runners and extending outwardly therefrom at angles obliquely to the runners, said blades arranged in a forward row and a rearward row, the blades in the forward row angling oppositely to the blades in the rearward row, an auxiliary runner, an upstanding arm connected to said auxiliary runner, and a lever pivotally supported by said front bars and operatively connected to said upstanding arm for moving said auxiliary runner into and out of a ground-engaging position.

In testimony whereof I affix my signature in presence of two witnesses.

KEITH McLEOD.

Witnesses:
E. J. CLARKE,
WALTER V. RING.

Copies of this patent may be obtained for five cents each, by addressing the "Commissioner of Patents, Washington, D. C."